June 30, 1931.  H. E. HAYWARD  1,812,095
SILENT CHAIN DRIVE
Filed April 5, 1929   2 Sheets-Sheet 1

Inventor
Henry E. Hayward
by Parker & Carter
Attorneys.

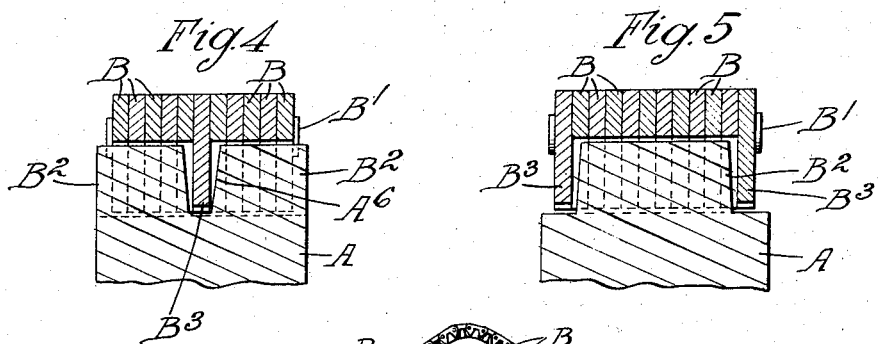
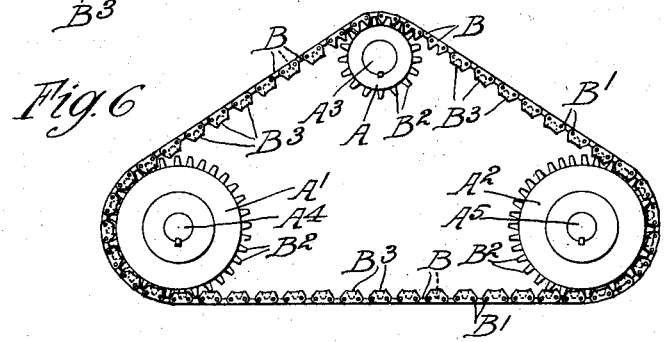
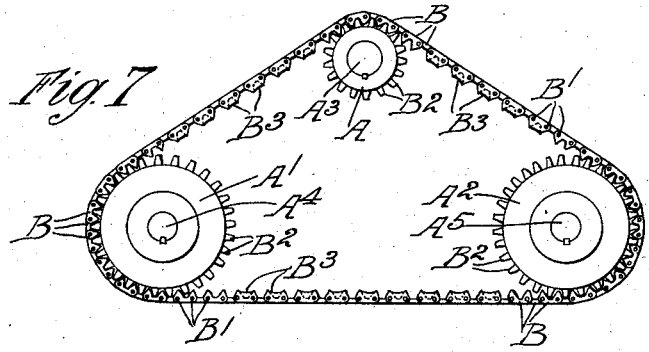
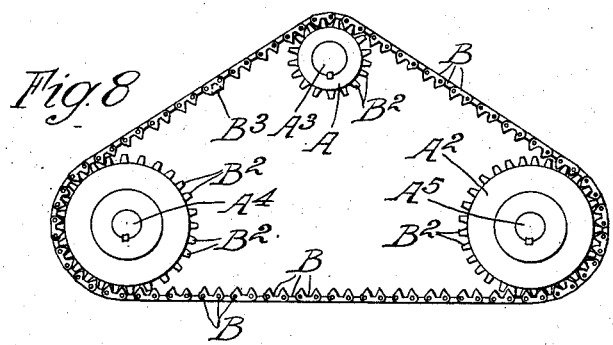

Patented June 30, 1931

1,812,095

UNITED STATES PATENT OFFICE

HENRY E. HAYWARD, OF INDIANAPOLIS, INDIANA, ASSIGNOR TO LINK-BELT COMPANY, OF CHICAGO, ILLINOIS, A CORPORATION OF ILLINOIS

SILENT CHAIN DRIVE

Application filed April 5, 1929. Serial No. 352,677.

My invention relates to improvements in silent chain drives and has for one object to provide a new and improved type of silent chain drive wherein the chain may be placed on and removed from the sprockets without disconnecting the ends of the chain and without laterally displacing any of the chain sprockets.

Silent chain is ordinarily held on the chain sprocket against displacement in a direction parallel with the axes of the sprockets by providing in one instance what are called guide links, that is links having flanges extending inwardly to a point between the center of rotation and the end of the tooth. Sometimes the tooth sprocket is cut away or grooved to engage these flanges when the flanges are located between the sides of the chain. In other instances these flanges are located at the outer sides of the chain and extend down along side the ends of the teeth in which case the teeth are continuous but terminate short of the outside edge of the chain. Heretofore it has been thought that these flanges must be substantially continuous and ordinary practice has been to have the flanges on every other link. When this is the case, silent chain can be mounted on the sprockets only in two ways, either by disconnecting the ends of the chain for assembly and then joining the ends after the chain is in place or by mounting one or more of the sprockets in such way that it may be moved transversely to permit the chain to be put in place and then moved back to bring the chain and sprockets into proper relation.

I have discovered that it is only necessary to have a comparatively small number of these guide links. Perhaps only one or two even in an entire chain but in any event in order to accomplish the assembly it is only necessary to cut away enough of these guide links to exceed the arc of engagement of the chain with one of the wheels of the drive. When this is done the chain is placed on one or more of the wheels in such position that that portion of the chain where the guide flanges are omitted comes in register with one of the sprockets. When this is done, the chain can be moved laterally onto the sprocket until it resumes its proper working position. When experience shows that as the chain is driven the remaining guide links engaging the sprockets are sufficient to keep the chain in line becase all but a very slight movement of the chain in a direction parallel to the rotation of the sprockets is prevented by the remaining guide flanges and since the chain is in constant rotation and since the flanges are working all the time when needed there is no chance for the lateral dis-placement of the chain to build up to a place where the chain gets off the sprockets.

Under some conditions it is desirable to provide a chain wherein the areas within which the guide links are omitted are such as to permit simultaneous lateral movement of the entire chain onto all the sprockets at once. In this case the guide links would be found when the chain was in assembly position only in the lengths of chain between the arcs of contact with all of the sprockets.

In order to assist in the operation of assembling the chain I may, if desired, provide one or more blank mandrels which will be engaged by the ends of the chain teeth and may be placed in juxtaposition with or against the face of the sprockets if desired means being provided for properly adjusting the chain on the mandrel and the mandrel with respect to the sprockets so that each individual link is held and guided by the mandrel as it is laterally displaced into working position on the sprocket. This is not essential but in some instances makes the assembly a simpler and easier matter.

My invention is illustrated more or less diagrammatically in the accompanying drawings, wherein—

Figure 4 shows a section through the chain with central guide links;

Figure 5 shows a section through the chain with side guide links;

Figure 6 is a diagrammatic view showing chain side links omitted for only one arc of contact;

Figure 7 is a diagrammatic view showing chain side links omitted for the arc of contact with all the sprockets;

Figure 8 shows but a single guide link.

Like parts are indicated by like characters throughout the specifications and drawings.

A is a driving sprocket. $A^1$ $A^2$ are driven sprockets. These sprockets are permanently mounted respectively on the shafts $A^3$ $A^4$ $A^5$. $A^6$ are grooves cut in the peripheries of all the sprockets where the teeth are cut away to make a place for the guide links.

Figure 1:
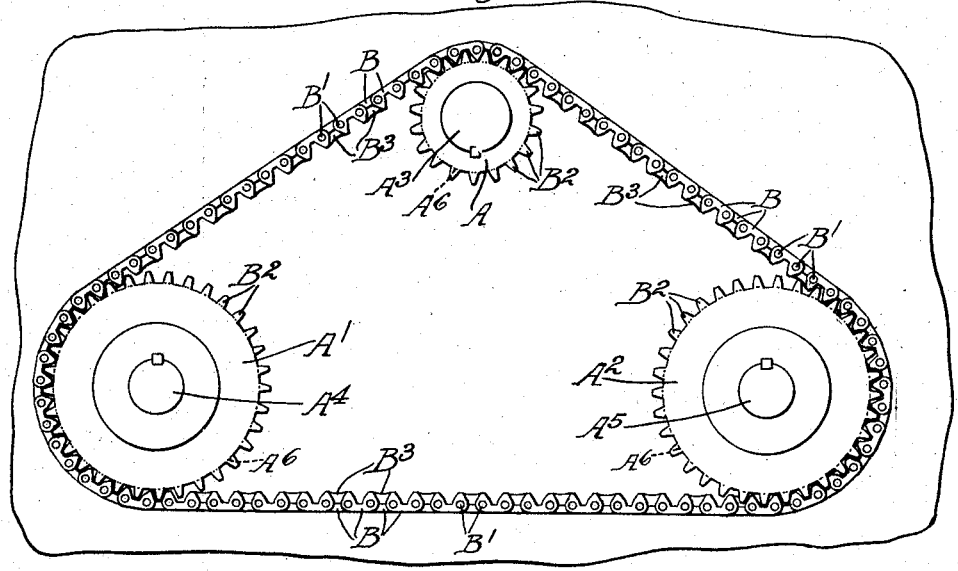
Figure 1 is a side elevation of a chain drive.
Figure 2:
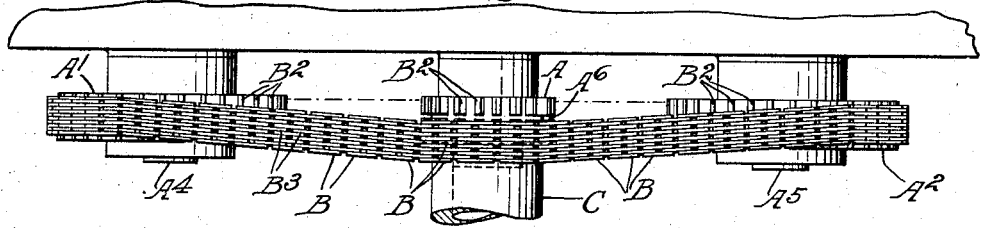
Figure 2 is a plan view of the chain drive as the drive is about to be assembled showing the chain in position on two of the sprockets.
Figure 3:
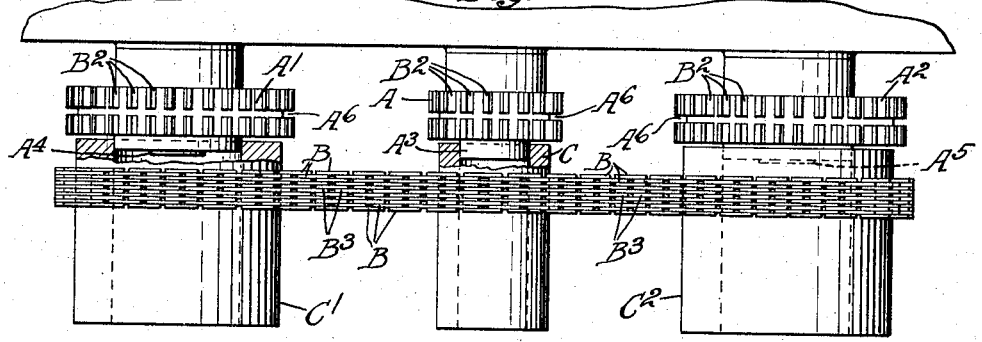
Figure 3 is a similar plan view showing the chain about to be placed on the sprockets when the chain is assembled by moving the entire chain laterally.

The silent chain controls all the sprockets. It is made up of a series of interlocking toothed links B B joined together end overlapping end in alternate relation by the pivot pins $B^1$. The teeth of the inks straddle the teeth $B^2$ of the sprocket. Placed centrally along the length of the chain are a series of guide links $B^3$ which links are not toothed but extend down toward the axis of rotation of the sprocket a distance substantially equal though it may be greater than or less than the depth of the chain tooth. These guide sprockets travel in the grooves in the peripheries of the gears and may be in engagement with the ends of the teeth to guide and center the chain and prevent it from moving laterally in a direction parallel with the axis of rotation of the gears. It is these guide links which ordinarily are so placed that they are associated with every alternate group of toothed links. It will be noted that in my invention I have shown the guide links omitted for a distance greater than the arc of contact between the chain and the smaller of the three sprockets so that as in Figure 2 the chain may be put in place engaging the two larger sprockets brought up against the face of the smaller sprocket and moved transversely into position thereon.

C is the mandrel having a smooth cylindrical surface of such size as when the teeth of the chain engage it the teeth are held in proper pitch relation, that is, in the same general relation that they are to be held in position on the sprocket so that they can be easily slid into relation with the sprocket without binding. This mandrel rides on the face of the sprocket, being centered thereon by the end of the shaft which carries the sprocket as indicated.

In the modified form, it is noted that there are a plurality of mandrels $C^1$ $C^2$ of a size corresponding to the position of the chain on the other two pinions or gears when assembled so that as indicated when the guide flanges are omitted to correspond with the arc of contact of all three of the sprockets, the chain may be bodily moved into register with the sprockets off the mandrels, the mandrels being then removed leaving the chain free to operate.

In the diagrammatic figures I have shown my invention as applied in different manners as under varying conditions a greater or lesser number of the guide links may be omitted and in the extreme case where but a single guide link is used experience has shown that for many purposes this one guide link is abundantly sufficient as the chain operates to maintain the chain in proper position on the sprockets.

I claim:

1. In a silent chain drive, a plurality of toothed peripherally grooved sprockets and a chain comprising a plurality of articulated toothed links in mesh with the sprocket teeth, means for preventing transverse movement of the chain comprising a single guide link, adapted to penetrate the sprocket and engage the ends of the sprocket teeth forming the sides of the groove.

2. In a silent chain drive, a plurality of toothed peripherally grooved sprockets and a chain comprising a plurality of articulated toothed links in mesh with the sprocket teeth, means for preventing transverse movement of the chain comprising guide links adapted to penetrate the sprocket and engage the ends of the sprocket teeth forming the sides of the groove, the guide links being omitted for a distance along the chain exceeding the arc of contact between the chain and one of the sprockets.

3. In a silent chain drive, a plurality of toothed peripherally grooved sprockets and a chain comprising a plurality of articulated toothed links in mesh with the sprocket teeth, means for preventing transverse movement of the chain comprising guide links adapted to penetrate the sprocket and engage the ends of the sprocket teeth forming the sides of the groove, the guide links being omitted along the chain at a plurality of places therealong in each case for a distance exceeding the arc of contact between the chain and each one of the sprockets.

4. In a silent chain drive, a plurality of toothed sprockets and a chain comprising a plurality of articulated toothed links in mesh with the sprocket teeth, means for preventing transverse movement of the chain comprising guide links adapted to engage the sprocket teeth, the links being omitted for a distance along the chain greater than the arc of contact with one of the sprockets.

5. In a silent chain drive, a plurality of toothed sprockets and a chain comprising a plurality of articulated toothed links in mesh with the sprocket teeth, means for preventing transverse movement of the chain comprising guide links adapted to engage the ends of the sprocket teeth, the links being omitted for a distance along the chain greater than the arc of contact with one of the sprockets, there being a plurality of places along the chain where the guide links are omitted, such places corresponding in position and length to the arc of contact between the chain and each of the sprockets.

6. In a silent chain drive, a plurality of toothed sprockets and a chain comprising a plurality of articulated toothed links in mesh with the sprocket teeth, means carried by the chain adapted to engage the ends of the sprocket teeth for preventing transverse movement of the chain thereon, said means being omitted through a length on the chain greater than the arc of contact between the chain and one of the sprockets.

7. In a silent chain drive, a plurality of toothed sprockets and a chain comprising a plurality of articulated toothed links in mesh with the sprocket teeth, means carried by the chain adapted to engage the sprocket teeth for preventing transverse movement of the chain thereon, said means being omitted through a length on the chain greater than the arc of contact between the chain and one of the sprockets, there being a plurality of areas on the chain where such means are omitted conforming to the position and angle of contact of each of the sprockets.

8. In a silent chain drive, a plurality of toothed sprockets and a chain comprising a plurality of articulated toothed links in mesh with the sprocket teeth, means carried by the chain adapted to engage the ends of the sprocket teeth for preventing transverse movement of the chain thereon, said means being omitted through a length on the chain greater than the arc of contact between the chain and one of the sprockets, and a mandrel in removable engagement with the sprocket adapted to engage the chain teeth and support them in an arc conforming to the position of the teeth on the sprocket to permit lateral displacement of the chain from the mandrel into position on the sprocket.

9. In a silent chain drive, a plurality of toothed sprockets and a chain comprising a plurality of articulated toothed links in mesh with the sprocket teeth, means carried by the chain adapted to engage the ends of the sprocket teeth for preventing transverse movement of the chain thereon, said means being omitted through a length on the chain greater than the arc of contact between the chain and one of the sprockets, there being a plurality of areas on the chain where such means are omitted conforming to the position and angle of contact of each of the sprockets, and a mandrel in removable engagement with the sprocket adapted to engage the chain teeth and support them in an arc conforming to the position of the teeth on the sprocket to permit lateral displacement of the chain from the mandrel into position on the sprocket.

10. In combination with a silent drive chain comprising a plurality of toothed sprockets and a chain made up of a plurality of articulated toothed links in mesh with the sprocket teeth, means for preventing transverse movement of the chain comprising guide links adapted to engage the ends of the sprocket teeth, said links being omitted to permit transverse movement of the chain on the sprocket for the purpose of assembly, a mandrel adapted to be associated with a sprocket to engage the ends of the chain teeth to hold them in normal position away from the center of rotation of the sprocket to permit their transverse movement into register with the teeth.

11. In a silent chain drive, a plurality of toothed sprockets, an endless chain comprising a plurality of articulated toothed links in mesh with the sprocket teeth, means for preventing transverse movement of the chain and aligning it on the sprocket teeth comprising means associated with a single pitch of the chain only adapted to engage successive sprockets, as the chain travels and to as such successive engagements take place align the chain on the sprocket at the point where such single means engages it.

Signed at Indianapolis, county of Marion, and State of Indiana, this 30th day of March, 1929.

HENRY E. HAYWARD.